(12) United States Patent
Doyle et al.

(10) Patent No.: US 9,268,543 B1
(45) Date of Patent: Feb. 23, 2016

(54) EFFICIENT CODE CACHE MANAGEMENT IN PRESENCE OF INFREQUENTLY USED COMPLIED CODE FRAGMENTS

(71) Applicant: International Business Machines Corporation, Armonk, NY (US)

(72) Inventors: Patrick R. Doyle, Toronto (CA); Marcel Mitran, Markham (CA); Marius Pirvu, Toronto (CA); Kevin A. Stoodley, Richmond Hill (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/493,503

(22) Filed: Sep. 23, 2014

(51) Int. Cl.
*G06F 9/45* (2006.01)

(52) U.S. Cl.
CPC .................................. *G06F 8/4442* (2013.01)

(58) Field of Classification Search
CPC ..................................................... G06F 8/443
USPC ................................................. 717/136–167
See application file for complete search history.

(56) References Cited

U.S. PATENT DOCUMENTS

| 6,397,379 | B1 * | 5/2002 | Yates et al. ..................... 717/140 |
| 7,111,290 | B1 * | 9/2006 | Yates et al. ..................... 717/158 |
| 2002/0108106 | A1 * | 8/2002 | Kramskoy et al. ............ 717/139 |
| 2009/0083720 | A1 * | 3/2009 | Bohizic et al. ................ 717/140 |
| 2012/0278581 | A1 | 11/2012 | Thomas et al. |
| 2013/0166816 | A1 * | 6/2013 | Atkisson et al. .............. 711/102 |
| 2014/0095778 | A1 | 4/2014 | Chung et al. |

OTHER PUBLICATIONS

Wahbe, Robert, et al. "Efficient software-based fault isolation." ACM SIGOPS Operating Systems Review. vol. 27. No. 5. ACM, 1994, pp. 203-216.*
Hazelwood, Kim, and Michael D. Smith. "Generational cache management of code traces in dynamic optimization systems." Proceedings of the 36th annual IEEE/ACM International Symposium on Microarchitecture. IEEE Computer Society, 2003, pp. 1-11.*
Udayakumaran, Sumesh, and Rajeev Barua. "Compiler-decided dynamic memory allocation for scratch-pad based embedded systems." Proceedings of the 2003 international conference on Compilers, architecture and synthesis for embedded systems. ACM, 2003, pp. 276-286.*
Anthony, et al., "To JIT or not to JIT: The Effect of Code Pitching on the Performance of .NET Framework", .NET Technologies' 2005 Conference Proceedings, ISBN 80-86943-01-1, © Union Agency.
Hazelwood, et al., "Code Cache Management Schemes for Dynamic Optimizers", Published in: Proceeding Interact '02 Proceedings of the Sixth Annual Workshop on Interaction between Compilers and Computer Architectures, p. 102, IEEE Computer Society, © 2014 ACM, Inc., <http://dl.acm.org/citation.cfm?id=857765>.

(Continued)

*Primary Examiner* — Satish Rampuria
(74) *Attorney, Agent, or Firm* — Edward Li

(57) ABSTRACT

A process, a computer program product, and a computer system for efficient code cache management implemented by a just-in-time compiler are provided. Embodiments of the present invention provide a practical approach to compile effectively for methods that are frequently executed over a short time period but are subsequently not executed frequently. The disclosed approach reduces the detrimental effects of compilation of such infrequently executed methods on throughput and garbage collection pause times.

18 Claims, 2 Drawing Sheets

(56) References Cited

OTHER PUBLICATIONS

Hazelwood, et al., "Generational Cache Management of Code Traces in Dynamic Optimization Systems", Published in: Proceedings Micro 36 Proceedings of the 36th annual IEEE/ACM International Symposium on Microarchitecture, p. 169, IEEE Computer Society, © 2014 ACM, Inc., <http://dl.acm.org/citation.cfm?id=956551>.

Hazelwood, et al., "Managing bounded code caches in dynamic binary optimization systems", Published in: Journal ACM Transactions on Architecture and Code Optimization (TACO), vol. 3, Issue 3, Sep. 2006, pp. 263-294, © 2014 ACM, Inc., <http://dl.acm.org/citation.cfm?doid=1162690.1162692>.

Zhang, et al., "Adaptive code unloading for resource-constrained JVMs", Published in: Proceeding LCTES '04 Proceedings of the 2004 ACM SIGPLAN/SIGBED conference on Languages, compilers, and tools for embedded systems, pp. 155-164, © 2014 ACM, Inc., <http://dl.acm.org/citation.cfm?id=997186>.

Zhang, et al., "Profile-driven code unloading for resource-constrained JVMs", Published in: Proceeding PPPJ '04 Proceedings of the 3rd international symposium on Principles and practice of programming in Java, pp. 83-90, © 2014 ACM, Inc., <http://dl.org/citation.cfm?id=1071581>.

* cited by examiner

EFFICIENT CODE CACHE MANAGEMENT IN PRESENCE OF INFREQUENTLY USED COMPLIED CODE FRAGMENTS

TECHNICAL FIELD OF THE INVENTION

The present invention relates generally to programming languages and compilers, and more particularly to efficient code cache management in the presence of infrequently used compiled code fragments.

BACKGROUND

In enterprise class Java applications, such as WebSphere Commerce, the execution profile typically includes a large number of methods; each of the methods takes a very small proportion of overall execution time. However, over time, these methods get compiled simply because the initial compilation is driven by method invocation counts. Once a method is executed certain times, the method gets compiled regardless of how long it has taken to execute the method for the certain times. This means that the Just-In-Time (JIT) compiler's code cache can contain many methods that are executed only infrequently. Such compilations can increase (code memory) footprints and startup/ramp-up time with little beneficial effect on throughput. However, the real problem stems from the fact that there is only a fixed amount of a code cache available for each instance of the JIT compiler. If the code cache gets filled with methods less important for throughput performance, more important subsequent compilations may not be successful since there is no space to write the generated code. Interpreting the more frequently executed methods which can not be compiled has a noticeable negative impact on throughput, because interpreting is an order of magnitude (e.g., 10x) slower than compiled code.

The simplest approach to a bounded code cache is to flush its entire content when the bounded code cache becomes full. This solution, referred to as code pitching, is employed by Microsoft's .NET Compact Framework as described by Anthony, Leung, and Srisa-an ("To JIT or not to JIT: The Effect of Code Pitching on the Performance of .NET Framework", 2005). As shown by the authors, while code pitching can degrade runtime performance, if it is done rarely enough, the penalty is barely visible. Thus, picking an appropriate maximum size for the code cache is important. One drawback of the study, as admitted by the authors, is that they considered only tiny applications which are not representative of a real-life workload. For big applications, where compilation overhead is significant, simply throwing away all the compiled code is going to put unnecessary strains on the computational resources.

Zhang and Krintz ("Profile-Driven Code Unloading for Resource-Constrained JVMs", 2004) propose to periodically (e.g., every 10 ms) discard, from the code cache, compiled methods which are unlikely to be used in the future. The candidates for eviction are chosen with the help of a lightweight profiling mechanism based on sampling. In a follow-up work ("Adaptive Code Unloading for Resource-Constrained JVMs", 2004), the authors develop an adaptive mechanism which determines when method eviction should take place. The idea is that frequency of the eviction should be dictated by memory pressure: the more time the JVM spends in the garbage collector, the more frequent the eviction process should be. However, this conclusion is a direct consequence of their particular implementation: code fragments reside in the Java heap and therefore compete for space with Java objects. Freeing more code makes room for Java objects and improves the time spent in the garbage collector. An important disadvantage of the selective method eviction process is that it creates a lot of fragmentation.

Hazelwood and Smith ("Code Cache Management Schemes for Dynamic Optimizers", 2002) avoid fragmentation by evicting code fragments in a FIFO (First In First Out) manner. The code cache is considered a big circular buffer and eviction takes place on demand, when a new code fragment needs to be stored. While this approach simplifies code cache management, it brings in the previous problem: because it is oblivious to the frequency of execution of code fragments, important compiled pieces of code can be evicted from the cache. However, the negative effects are likely milder than in the code pitching case where the entire cache is cleared.

Hazelwood and Smith ("Generational Cache Management of Code Traces in Dynamic Optimization Systems", 2003) propose the use of generational code caches. The code cache space is split into three regions: nursery, probation cache, and persistent cache. New code fragments are stored in the nursery cache, possibly evicting other code fragments in case there is not enough room. The victim of an eviction is moved into the probation cache whose main role is to determine how important the evicted code fragments are. When the room needs to be made into the probation cache, either the code fragment to be eliminated is moved into the persistent code cache if it has been used since moved to the probation cache, or the code fragment to be eliminated is simply discarded. This technique works relatively well, but complicates code cache management a great deal because of the following factors. (1) Moving code fragments around from one code cache to another requires the code to be relocatable. (2) Direct transition from one code fragment to another is not possible, unless metadata is kept around to fix all "callers" when the "callee" is moved or discarded (it is called "link repair" by the authors of the paper). (3) A mechanism that monitors code usage is required to determine whether or not a piece of code should be moved to the persistent code cache or discarded.

Throughput and garbage collection (GC) pause times can also be indirectly affected by the caching of a large number of infrequently used compiled methods. A GC cycle is often the perfect time to reclaim the code cache space for unloaded or recompiled methods; the reclamation process includes locating and freeing up the run time metadata (e.g., class hierarchy assumptions, GC relevant stack/registers information, exception tables, etc.). Different kinds of JIT metadata are stored in different hashtables (for example, in IBM J9 VM or IBM Testarossa JIT compiler) and hence locating all the information can be a very time consuming process that scales linearly with the amount of generated code. Even if the compilations are only infrequently used, the amount of metadata generated for these compilations can still affect the overall time for locating JIT metadata.

SUMMARY

In one aspect, a process for efficient code cache management implemented by a just-in-time compiler is provided. The process includes: determining whether a method is frequently executed; placing a compiled code of the method in a first code cache, in response to determining that the method is frequently executed; determining whether a second code cache is full, in response to determining that the method is not frequently executed; placing the compiled code in the second code cache, in response to determining that the second code cache is not full; and flushing a subdivision of the second code cache and then placing the compiled code in the second code cache, in response to determining that the second code cache is full.

In another aspect, a computer program product for efficient code cache management implemented by a just-in-time compiler is provided. The computer program product comprising a computer readable storage medium having program code embodied therewith. The program code is executable to: determine whether a method is frequently executed; place a compiled code of the method in a first code cache, in response to determining that the method is frequently executed; determine whether a second code cache is full, in response to determining that the method is not frequently executed; place the compiled code in the second code cache, in response to determining that the second code cache is not full; and flush a subdivision of the second code cache and then place the compiled code in the second code cache, in response to determining that the second code cache is full.

In yet another aspect, a computer system for efficient code cache management implemented by a just-in-time compiler is provided. The computer system comprises one or more processors, one or more computer readable tangible storage devices, and program instructions stored on at least one of the one or more computer readable tangible storage devices for execution by at least one of the one or more processors. The program instructions are executable to determine whether a method is frequently executed. The program instructions are executable to, in response to determining that the method is frequently executed, place a compiled code of the method in a first code cache. The program instructions are executable to, in response to determining that the method is not frequently executed, determine whether a second code cache is full. The program instructions are executable to, in response to determining that the second code cache is not full, place the compiled code in the second code cache. The program instructions are executable to, in response to determining that the second code cache is full, flush a subdivision of the second code cache and then place the compiled code in the second code cache.

DETAILED DESCRIPTION

Figure 1:
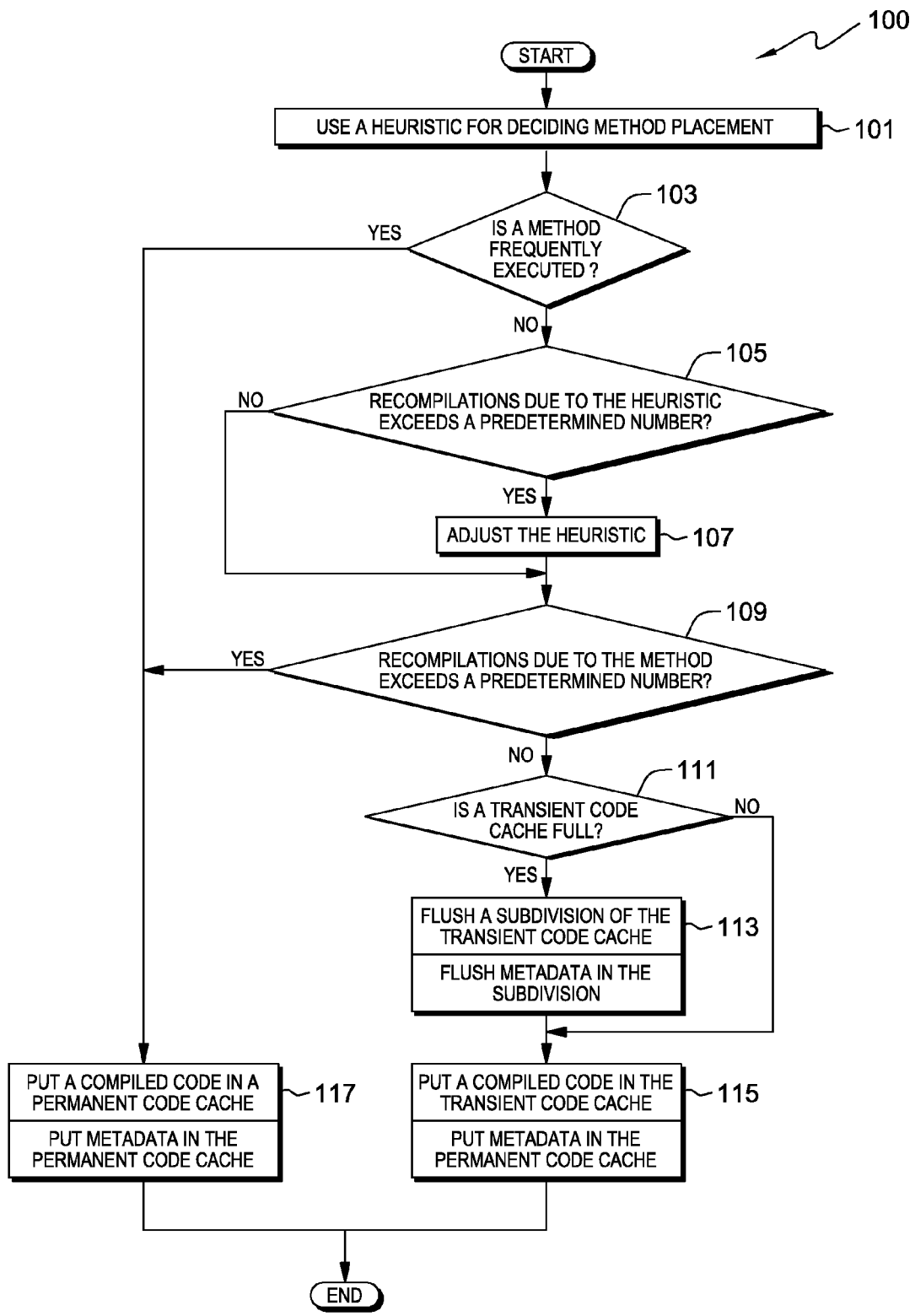
FIG. 1 is a flowchart illustrating operational steps for efficient code cache management in presence of infrequently used compiled code fragments, in accordance with one embodiment of the present invention.

There are different types of infrequently executed methods: (1) methods that are executed frequently over a brief time period but are never executed afterward (in which the containing class gets unloaded); (2) methods that are executed frequently over a brief time period but rarely execute afterwards (in which, naturally, the containing class is not unloaded); and (3) methods that are never executed frequently over any time period (or window) but are executed infrequently over the whole run (in which the containing class is not unloaded). Embodiments of the present invention provide a practical approach to compile effectively for methods that are frequently executed over a short time period but are subsequently not executed frequently (especially the first and the second types of methods mentioned above). It is beneficial to compile the first and the second types of methods; however, once a certain time period passes, the compilations are rarely if ever used again. A goal of the disclosed approach is to reduce the detrimental effects of compilation of such infrequently executed methods on throughput and GC (garbage collection) pause times. Although the approach can also be applied to the third type of methods, it may not be as beneficial since it may end up compiling a lot of methods repeatedly.

In the embodiments of the present invention, the approach includes a heuristic to identify methods that are likely to execute frequently over a short time period but are rarely executed afterwards. Identifying infrequently executed methods can be done using a static heuristic or a dynamic heuristic. An example is using the static heuristics for compilations from auto generated classes, i.e., classes that are not from .class files on the disk but generated on the fly by the running Java program. Usually, the auto generated classes are associated with a class loader that is instantiated for some task (e.g., handling a customer session); after the task is completed, the class loader is garbage-collected and all the classes loaded by the class loader are unloaded. Another example is using the static heuristics for compilations from Java Server Pages (JSP) classes, i.e., methods in classes produced by the JSP compiler. These are used fairly infrequently in practice, because the JSP compiler in WebSphere Application Server (WAS) produces many different methods that are different only slightly in terms of constants hardcoded in the bytecodes. Dynamic heuristics can be more reliable in terms of identifying infrequently executed methods in a given workload, and additionally dynamic heuristics can also detect phase changes that lead to a class of methods no longer being infrequently executed. Regarding determining whether a method is frequently executed, the program must monitor an invocation count of the method. If the invocation count of the method exceeds a predetermined number, the method is deemed frequently executed. Note that any methods compiled at higher optimization levels as a result of the JIT compiler's usual heuristics to determine hotness (based on sampling) should not be considered infrequently executed.

The approach further includes segregated code caches: N code caches for infrequently executed methods (hereafter referred to as "transient code cache(s)") and M code caches for everything else (hereafter referred to as "permanent code cache(s)"). Without loss of generality, N=1 and M=1 are assumed in the following discussion of embodiments. In embodiments of this invention, a code cache space is logically split into two regions with different responsibilities and functionality: a transient code cache that stores infrequently executed methods and a permanent code cache that stores frequently executed methods. The choice for the proportion of the overall code cache to use for the infrequently executed methods is implementation dependent. The exact size can be chosen once at JVM (Java Virtual Machine) startup; alternatively, the exact size can be varied as the program runs (i.e., based on the dynamic behavior observed), subject to availability of the code cache space. The JIT compiler can also choose to subdivide the space available for frequently and infrequently executed methods compilations into several distinct code caches using standard heuristics, e.g., typically the JIT compiler employs multiple compilation threads to do compilations and each thread has a dedicated code cache to avoid synchronization issues when emitting code. In addition to segregating the compiled code, the approach includes segregating the JIT metadata associated with the compiled code for infrequently executed methods into a separate top level structure. Segregating the JIT metadata has efficiency benefits when the code cache is to be flushed. The JIT metadata for all methods from the transient code cache are stored in a small number of dedicated "bulk allocated" memory segments. This arrangement enables a relatively cheap way to free up memory when the transient code cache is to be flushed. Instead of performing a linear walk over the metadata associated with the code in the transient code cache and freeing them individually (or piece by piece), the JIT compiler frees the dedicated segments in bulk. Moreover, by segregating the JIT metadata for those infrequently executed methods, they will not be encountered when the JIT metadata structure is walked for other more frequently executed methods; therefore, there is a small "execution speed" benefit to segregating the metadata as well.

The approach yet further includes a mechanism to deal with the transient code cache that is full: to flush all the code in one or more of subdivisions of the transient code cache and to delete all the JIT (Just-in-Time) metadata for methods in the one or more of the subdivisions. Flushing is only possible by preventing any future invocations of methods compiled in the code cache and transferring out of any invocations already in progress by using the general OSR (On Stack Replacement) mechanism. The embodiments provide a simple yet practical scheme to reduce the compensation cost associated with getting rid of the code for methods in the transient code cache, without having to walk code locations and patch them in any way that is possible, specifically because the methods in the transient code cache are chosen such that they are infrequently executed. Flushing the one or more of the subdivisions of the transient code cache and discarding all the generated code therein reverse the state of methods in the one or more of the subdivisions of the transient code cache to interpreted code. This in turn resets the invocation count to a non-negative value and restarts to count the invocation of the methods. The non-negative value for a given method depends on the policy for the next compilation, i.e., to accelerate the next compilation.

Generally speaking, dispatches to methods can be done via direct calls or indirect calls (e.g., via a virtual function table or interface table). Even when the source code contains an indirect call, the JIT compiler may employ an approach such as PIC (polymorphic inline cache) to emit a guard test followed by a direct call to the methods called from a given call site. For this reason, the proportion of direct calls found in a compiled body can be quite high. Because the broken caller to callee links need to be repaired, the direct calls are problematic for the flushing of the transient code cache. This problem is typically resolved by maintaining some metadata around; the metadata allows the identification of all call sites which need to be patched. However, the approach in this invention does not follow the typical solution. In the embodiments of the present invention, for a caller/callee AB pair, where method A does not belong to the transient code cache while method B belongs to the transient cache, the JIT compiler is not allowed to generate a direct call. Instead, the JIT compiler makes the call go through some small amount of general "glue" instructions, which will look up the target address from a field on the JVM's method data structure and do the dispatch. The main advantage of the approach in this invention is that the JIT compiler only needs to patch a small amount of memory in the JVM's method data structure and virtual/interface method tables, without keeping track of code memory locations. This approach does not impose a performance penalty because the methods in the transient code cache are supposed to be called very infrequently. On the other hand, if both the caller and the callee reside in the transient code cache, direct calls from one to another are perfectly feasible since both methods disappear at the same time during the flush operation.

The approach yet further includes a backup mechanism, whereby the JVM/JIT compiler detects incorrect guesses for expected lifetimes of methods and incorrect placement of compiled code for such methods, and the JVM/JIT compiler feeds this back into the heuristic so as to adapt to the actual behavior of the program. The backup mechanism is employed to detect whether the same method is repeatedly being compiled because the method is placed into the transient code cache and flushed repeatedly. The JVM/JIT compiler can keep track of the number of times the method is compiled into the transient code cache, via a simple counter in the JVM's representation of the method. Once the method is compiled a certain number of times into the transient code cache, the JVM/JIT compiler will compile it into the permanent code cache. At the same time, the JVM/JIT compiler keeps track of how many times a specific method placement heuristic has yielded a wrong decision (placement in the transient code cache, followed by a flush, followed by a recompilation) irrespective of the method identity. Once a certain threshold of wrong decisions has been reached, the JVM/JIT alters the specific heuristic that has identified that the method as a candidate for the transient code cache (e.g., to turn the specific heuristic off). In other words, each decision about whether the compiled code of the method is placed in the transient code cache is fed back to the overall heuristic to change the aggression level for identifying candidates in the future.

The approach provided in embodiments of this invention has the following advantages. (1) It does not suffer fragmentation issues because the approach flushes the transient code cache and does not leave compilation stubs behind. (2) Flushing is restricted to the transient cache such that important methods are unlikely to be evicted as long as the selection of heuristics works reasonably well. (3) Code fragments are not moved from one code cache to another such that the generated code does not have to be relocatable. (4) No metadata is needed to deal with broken links when code fragments are discarded. (5) GC pause times are improved due to faster code cache management. (6) Searching for metadata in the mainline (non-transient) code cache is faster because the information regarding the infrequently used methods has been moved to a separate data structure.

FIG. 1 is flowchart 100 illustrating operational steps for efficient code cache management in presence of infrequently used compiled code fragments, in accordance with one embodiment of the present invention. At step 101, a programming compiler uses a heuristic for deciding method placement. At this step, the programming compiler applies the heuristic to identify methods that are executed frequently over a short time period but are rarely executed afterwards. In the next steps, the programming compiler will use the heuristic to determine whether the methods are frequently executed and where the methods are placed. In previous paragraphs of this document, the heuristic has been discussed in detail.

Referring to FIG. 1, at decision block 103, the programming compiler using the heuristic determines whether a method is frequently executed. In response to determining that the method is frequently executed (YES branch of decision block 103), the programming compiler at step 117 puts a compiled code for the method in a permanent code cache and also puts metadata of the compiled code for the method in the permanent code cache. As described in previous paragraphs of this document, the permanent code cache is used to store frequently executed methods.

In response to determining that the method is not frequently executed (NO branch of decision block 103), at decision block 105, the programming compiler determines whether the number of recompilations due to the heuristic exceeds a first predetermined value. The programming compiler keeps track of how many times the heuristic has yielded a wrong decision.

In response to determining that the number of the recompilations due to the heuristic exceeds the first predetermined value (YES branch of decision block 105), the programming compiler at step 107 adjusts the heuristic. For example, the programming compiler changes the aggression level for identifying frequently executed methods.

In response to determining that the number of the recompilations due to the heuristic does not exceed the first predetermined value (NO branch of decision block 105) or after step 107, the programming compiler at decision block 109 determines whether the number of recompilations due to the method exceeds a second predetermined value. Using the backup mechanism described in previous paragraph of this document, the programming compiler checks whether the same method is repeatedly being compiled because the method is placed into a transient code cache and flushed repeatedly.

In response to determining that the number of the recompilations due to the method exceeds the second predetermined value (YES branch of decision block 109), the programming compiler executes step 117 (i.e., puts a compiled code for the method in the permanent code cache and also puts metadata of the compiled code for the method in the permanent code cache).

In response to determining that the number of the recompilations due to the method does not exceed the second predetermined value (NO branch of decision block 109), the programming compiler, at decision block 111, determines whether a transient code cache is full. The transient code cache is used to store infrequently executed methods.

In response to determining that the transient code cache is full (YES branch of decision block 111), the programming compiler at step 113 flushes a subdivision of the transient code cache and also flushes metadata in the subdivision. At this step, the programming compiler flushes all the code in the subdivision of the transient code cache and deletes all the JIT (Just-in-Time) metadata for methods in the subdivisions.

In response to determining that the transient code cache is not full (NO branch of decision block 111) or after step 113, the programming compiler puts at step 115 the compiled code of the method in the transient code cache and puts the metadata of the compiled code for the method in the transient code cache.

Figure 2:
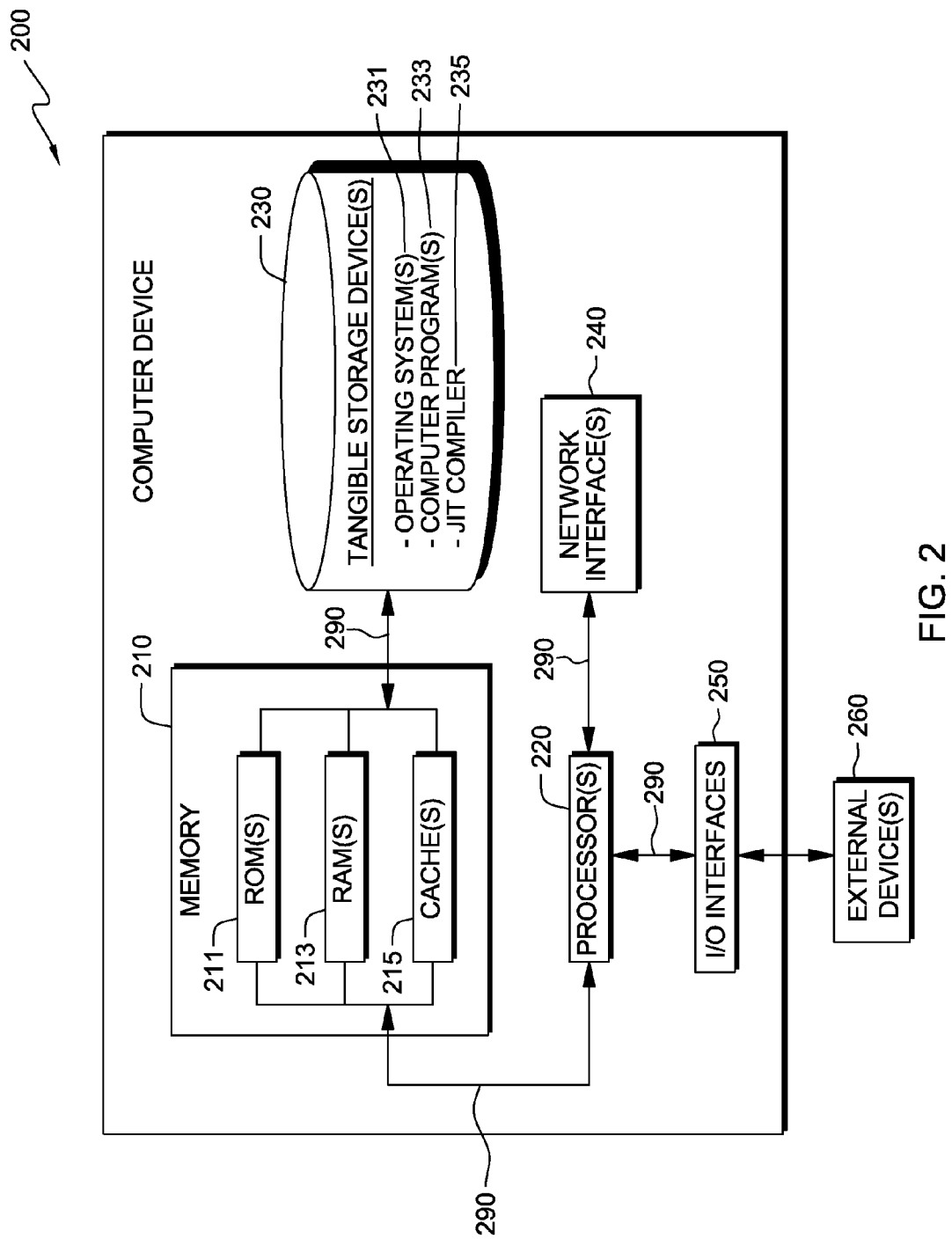
FIG. 2 is a diagram illustrating components of a computer device hosting a programming compiler that implements the operational steps shown in FIG. 1, in accordance with one embodiment of the present invention.

FIG. 2 diagram illustrating components of computer device 200 hosting a programming compiler that implements the operational steps shown in FIG. 1, in accordance with one embodiment of the present invention. It should be appreciated that FIG. 2 provides only an illustration of one implementation and does not imply any limitations with regard to the environment in which different embodiments may be implemented.

Referring to FIG. 2, computer device 200 includes processor(s) 220, memory 210, tangible storage device(s) 230, network interface(s) 240, and I/O (input/output) interface(s) 250. In FIG. 2, communications among the above-mentioned components of computing device 200 are denoted by numeral 290. Memory 210 includes ROM(s) (Read Only Memory) 211, RAM(s) (Random Access Memory) 213, and cache(s) 215. One or more operating systems 231 and one or more computer programs 233 reside on one or more computer readable tangible storage device(s) 230. The programming compiler or the JIT (Just-in-Time) compiler 235 resides on one or more computer readable tangible storage device(s) 230. Computing device 200 further includes I/O interface(s) 250. I/O interface(s) 250 allows for input and output of data with external device(s) 260 that may be connected to computing device 200. Computing device 200 further includes network interface(s) 240 for communications between computing device 200 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A process for efficient code cache management implemented by a just-in-time compiler, the process comprising:
    a computer processor determining whether a method is frequently executed;
    in response to determining that the method is frequently executed, the computer processor placing a compiled code of the method in a first code cache which is a permanent code cache;
    the computer processor determining whether a number of recompilations due to the method exceeds a predetermined number;
    in response to determining that the method is not frequently executed and determining that the number of recompilations due to the method does not exceed the predetermined number, the computer processor determining whether a second code cache is full, wherein the second code cache is a transient code cache;
    in response to determining that the second code cache is not full, the computer processor placing the compiled code in the second code cache; and
    in response to determining that the second code cache is full, the computer processor flushing a subdivision of the second code cache and then placing the compiled code in the second code cache.

2. The process of claim 1, further comprising:
    in response to determining that the method is frequently executed, the computer processor placing metadata of the compiled code in the first code cache.

3. The process of claim 1, further comprising:
    in response to determining that the method is not frequently executed and the second code cache is full, the computer processor flushing metadata in the subdivision of the second code cache.

4. The process of claim 1, further comprising:
    in response to determining that the method is not frequently executed and the second code cache is not full, the computer processor placing metadata of the compiled code in the second code cache.

5. The process of claim 1, further comprising:
    the computer processor determining whether a number of recompilations due to a heuristic exceeds a predetermined number, wherein the heuristic is used by the just-in-time compiler to determine whether the method is frequently executed; and
    in response to determining that the number of recompilations due to the heuristic exceeds the predetermined number, the computer processor adjusting the heuristic.

6. The process of claim 1, further comprising:
    in response to determining that the number of recompilations due to the method exceeds the predetermined number, the computer processor placing the compiled code of the method in the first code cache.

7. A computer program product for efficient code cache management implemented by a just-in-time compiler, the computer program product comprising a computer readable storage medium having program code embodied therewith, the program code executable to:
    determine whether a method is frequently executed;
    in response to determining that the method is frequently executed, place a compiled code of the method in a first code cache which is a permanent code cache;
    determine whether a number of recompilations due to the method exceeds a predetermined number;
    in response to determining that the method is not frequently executed and determining that the number of recompilations due to the method does not exceed the predetermined number, determine whether a second code cache is full, wherein the second code cache is a transient code cache;

in response to determining that the second code cache is not full, place the compiled code in the second code cache; and in response to determining that the second code cache is full, flush a subdivision of the second code cache and then place the compiled code in the second code cache.

8. The computer program product of claim 7, further comprising the program code executable to:

in response to determining that the method is frequently executed, place metadata of the compiled code in the first code cache.

9. The computer program product of claim 7, further comprising the program code executable to:

in response to determining that the method is not frequently executed and the second code cache is full, flush metadata in the subdivision of the second code cache.

10. The computer program product of claim 7, further comprising the program code executable to:

in response to determining that the method is not frequently executed and the second code cache is not full, place metadata of the compiled code in the second code cache.

11. The computer program product of claim 7, further comprising the program code executable to:

determine whether a number of recompilations due to a heuristic exceeds a predetermined number, wherein the heuristic is used by the just-in-time compiler to determine whether the method is frequently executed; and in response to determining that the number of recompilations due to the heuristic exceeds the predetermined number, adjust the heuristic.

12. The computer program product of claim 7, further comprising the program code executable to:

in response to determining that the number of recompilations due to the method exceeds the predetermined number, place the compiled code of the method in the first code cache.

13. A computer system for efficient code cache management implemented by a just-in-time compiler, the computer system comprising:

one or more processors, one or more computer readable tangible storage devices, and program instructions stored on at least one of the one or more computer readable tangible storage devices for execution by at least one of the one or more processors, the program instructions executable to:

determine whether a method is frequently executed;

in response to determining that the method is frequently executed, place a compiled code of the method in a first code cache which is a permanent code cache;

determine whether a number of recompilations due to the method exceeds a predetermined number;

in response to determining that the method is not frequently executed and determining that the number of recompilations due to the method does not exceed the predetermined number, determine whether a second code cache is full, wherein the second code cache is a transient code cache;

in response to determining that the second code cache is not full, place the compiled code in the second code cache; and in response to determining that the second code cache is full, flush a subdivision of the second code cache and then place the compiled code in the second code cache.

14. The computer system of claim 13, further comprising the program instructions executable to:

in response to determining that the method is frequently executed, place metadata of the compiled code in the first code cache.

15. The computer system of claim 13, further comprising the program instructions executable to:

in response to determining that the method is not frequently executed and the second code cache is full, flush metadata in the subdivision of the second code cache.

16. The computer system of claim 13, further comprising the program instructions executable to:

in response to determining that the method is not frequently executed and the second code cache is not full, place metadata of the compiled code in the second code cache.

17. The computer system of claim 13, further comprising the program instructions executable to:

determine whether a number of recompilations due to a heuristic exceeds a predetermined number, wherein the heuristic is used by the just-in-time compiler to determine whether the method is frequently executed; and in response to determining that the number of recompilations due to the heuristic exceeds the predetermined number, adjust the heuristic.

18. The computer system of claim 13, further comprising the program instructions executable to:

in response to determining that the number of recompilations due to the method exceeds the predetermined number, place the compiled code of the method in the first code cache.

* * * * *